March 1, 1932.  F. R. ELDER ET AL  1,847,934
MOTOR CONTROL SYSTEM
Filed May 20, 1930

Inventors:
Frank R. Elder
Allen E. Bailey Jr
Harold B. La Roque,
by Charles E. Tullar
Their Attorney.

Patented Mar. 1, 1932

1,847,934

UNITED STATES PATENT OFFICE

FRANK R. ELDER AND ALLEN E. BAILEY, JR., OF SCHENECTADY, AND HAROLD B. LA ROQUE, OF SCOTIA, NEW YORK, ASSIGNORS TO GENERAL ELECTRIC COMPANY, A CORPORATION OF NEW YORK

MOTOR CONTROL SYSTEM

Application filed May 20, 1930. Serial No. 454,096.

This invention relates to systems for controlling the operation of electric motors; more particularly to systems for controlling the speed of electric motors and has for an object the provision of a simple, reliable and efficient system for causing the motor to operate satisfactorily over a very wide range of speed values.

Heretofore it has been possible by known systems to obtain a speed range having a ratio of 10–1 between top and bottom speeds. Aside from the expense of the apparatus required in such systems there is the further disadvantage that the operation is extremely unstable at the higher speeds and therefore unsatisfactory.

In some classes of industrial control a very much greater speed range is required than can be obtained satisfactorily by methods heretofore proposed. For example, in theatre dimming systems in which a motor driven grand master dimming switch is employed, it is often necessary that the time required for a complete dimming operation be variable between a period of from three seconds to three minutes, which means that the motor for driving the grand master switch must have a speed range in which the ratio between the top and bottom speeds is 60–1. The present invention also provides a system in which the satisfactory operation of the motor is possible at all points within a speed range having a ratio of as high as 60–1 between the top and bottom speeds.

In carrying our invention into effect in one form thereof, we provide electric discharge devices in the field and armature circuits of the motor, together with means for causing these electric discharge devices to vary the current in the armature and field circuits successively and in a predetermined sequence.

Figure 1:
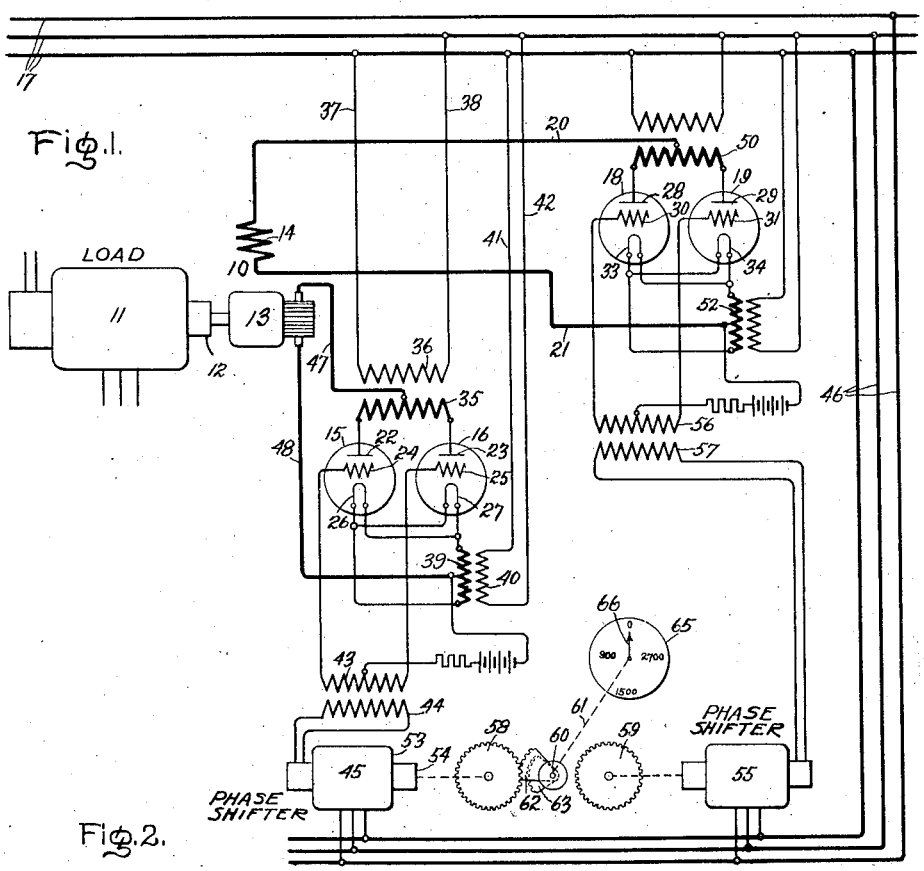

For the purposes of illustration, we have shown diagrammatically in Fig. 1 the invention as embodied in a control system in which a small direct current motor is employed to operate the grand master dimming switch of a theater illumination control system. It is to be understood, however, that the application of this invention is not limited to theater dimming systems since conceivably it may be satisfactorily employed in any motor control system in which a wide range of speed is desired.

Figure 2:
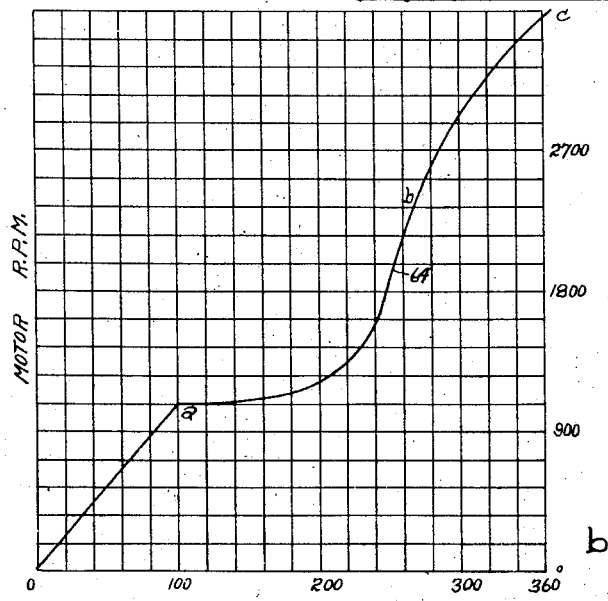

Fig. 2 is a graph illustrating the relation between the motor R. P. M. and the rotation of the master control knob to be described later.

Referring now to the drawings, a small motor 10 is mechanically coupled to any suitable load, such for example as the grand master theater dimming switch 11 by means of the reduction gearing 12. As shown in the drawings, the motor 10 is of the direct current type, it being provided with an armature 13 and a separately excited field winding 14. The motor 10 is designed so that higher than normal voltage may be applied to its armature without injury. Direct current is supplied to the armature member 13 by means of suitable electric valve apparatus comprising the electric discharge devices 15 and 16 which in turn are supplied with alternating current from any suitable source such for example as the polyphase source represented in the drawing by the supply lines 17. Similar valve apparatus comprising the electric discharge devices 18 and 19 are supplied with alternating current from the alternating current source 17 and in turn supply rectified current to the direct current field winding 14, the terminals of which are connected in the output circuit of the electric discharge devices 18 and 19 by means of the conductors 20 and 21.

The electric discharge devices 15 and 16 are preferably of the three electrode type and as shown they are respectively provided with plates or anodes 22 and 23, grids 24 and 25 and filamentary cathodes 26 and 27 and the electric discharge devices 18 and 19 are likewise of the three electrode type, they being respectively provided with plates 28 and 29, grids 30 and 31 and filamentary cathodes 33 and 34.

Although any suitable type of electric discharge device may be used, the devices 15, 16, 18 and 19 shown in the drawings are preferably of the three electrode type into the envelope of which a small quantity of an inert gas such, for example, as mercury vapor, is introduced after the envelope has been exhausted.

The presence of such an inert gas within the envelope of the tube serves to change the usual electron discharge into an arc stream and thereby constitutes the device an electrostatically or grid controlled arc rectifier; that is to say, the magnitude of the current in the output circuit of the tubes 15 and 16, for example, may be varied as desired by varying the phase relationship between the potentials applied to the grids and anodes of these tubes as will be well understood by persons skilled in the art. This type of tube is further characterized by the fact that a very large amount of power in the output circuit can be controlled by a very small amount of power in the input circuit.

The tubes 15 and 16 are connected in a well-known manner to rectify the full wave of the alternating current energy received from the polyphase source 17. As shown, the plates or anodes 22 and 23 are respectively connected to opposite terminals of the secondary winding 35 of the anode transformer, the primary winding 36 of which is supplied with alternating current from one phase of the polyphase source 17 to which its terminals are connected by means of the conductors 37 and 38. Alternating current for heating the filamentary cathodes 26 and 27 is supplied thereto from the secondary winding 39 of the filament transformer the primary winding 40 of which is likewise supplied with alternating current from the source 17 to one phase of which it is connected by means of the conductors 41 and 42. The grid members 24 and 25 are connected to opposite terminals of the secondary winding 43 of the grid transformer, the primary winding 44 of which is supplied with alternating electromotive force through the phase shifting device 45 which as shown is connected to the source 17 by means of the conductors 46.

As shown in the drawings, the electric discharge devices 18 and 19 are connected in a manner similar to that just described for the electric discharge device 15 and 16 and, therefore, serve to supply rectified current to the direct current field winding 14, the opposite terminals of which are connected in the output circuit of these devices; that is to say, one terminal of the field winding 14 is connected by means of the conductor 20 to the mid-point of the secondary winding 50 of the anode transformer whilst the opposite terminal is connected by means of the conductor 21 to a mid tap on the secondary winding 52 of the filament transformer.

As previously pointed out, the armature 13 of the motor is connected in the output circuit of the discharge devices 15 and 16; that is to say, one brush is connected to a mid-tap of the secondary winding 35 of the anode transformer by means of the conductor 47 whilst the opposite brush is connected to the mid-point of the filament transformer by means of the conductor 48. Persons skilled in the art will understand that a rectified current will flow in the output circuit of the electric discharge devices 15 and 16 when connected with an alternating current source in the manner just described.

As is well understood by persons skilled in the art, the magnitude of the current flowing in the output circuit of electric discharge devices of the type described may be varied by varying the phase relationship between the alternating potentials applied to their anodes and grids respectively. For this purpose the phase shifting device 45 is connected in circuit between the grids 24 and 25 of electric discharge devices 15 and 16 and the alternating current source 17. The phase shifting device 45 is provided with a stator member 53 upon which is wound a distributed polyphase winding (not shown) and with a rotor member 54 upon which a single phase winding (not shown) is wound in inductive relation to the polyphase winding. As indicated in the drawings the terminals of the distributed polyphase winding are connected to the polyphase source 17 by means of the conductors 46 whilst the terminals of the inductively related single phase winding are connected to opposite terminals of the primary winding 44 of the grid transformer.

When polyphase alternating current is supplied to the distributed polyphase winding of the phase shifting device 45 a rotating magnetic field is set up which induces a single phase alternating current E. M. F. in the single phase winding inductively related thereto and this single phase electromotive force is impressed upon the grids 24 and 25. Persons skilled in the art will understand that the phase relationship between this single phase electromotive force applied to the grids and the alternating electromotive force applied to the anodes 15 and 16 may be varied as desired by varying the angular relationship of the rotor and stator windings of the phase shifting device 45.

A phase shifting device 55 which is similar in all respects to the phase shifting device 45 is connected between the polyphase source 17 and the grids 30 and 31 of the electric discharge devices 18 and 19 through the primary and secondary windings 56 and 57 of a grid transformer. The phase shifting device 55 operates in a manner identical to that just described for the phase shifting device 45 to vary the phase relationship between the anodes 28 and 29 and the grids 30 and 31 and likewise to vary the magnitude of the current supply through the output circuit to the direct current field winding 14. The gears 58 and 59 are respectively mounted upon the shafts of the rotor members of the phase shifting devices 45 and 55. A master control device shown in the drawings as a manually operable knob 60 is mounted upon a shaft 61. The mutilated gear segments 62 and 63 mounted upon the shaft 61 engage the gears 58 and 59 alternately and in predetermined sequence in response to operation of the knob 60.

The respective sizes and the angular relationship of the mutilated gear segments 62 and 63 upon the shaft 61 are so chosen that when the knob 60 is turned in a counterclockwise direction the rotor member 54 of the phase shifting device is turned through an angle of approximately 50 electrical degrees after which the segment 62 becomes disengaged from the gear wheel 58 and the segment 63 engages the gear wheel 59 to rotate the rotor member of the phase shifting device 55 through an angle of approximately 85 electrical degrees, at the conclusion of which operation the segment 63 becomes disengaged from the gear wheel 59 and the segment 62 reengages the gear wheel 58 to drive the rotor member 54 of the phase shifting device 55 through an angle of approximately 55 electrical degrees thus completing the cycle.

Initially the angular relationship of the rotors 53 and 54 of the grid phase shifting device 45 is so chosen that electric discharge devices 15 and 16 supply zero current in the output circuit whilst the angular relationship between the rotor and stator members of the phase shifting device 55 is so chosen initially that electric discharge devices 18 and 19 supply maximum current through their output circuit to the direct current field winding 14.

With the apparatus in the initial position just described the operation of my invention is as follows: The master control knob 60 is rotated in a counterclockwise direction, the result of which is to vary the angular relationship between the stator and rotor members 53 and 54 of the phase shifting device 45 and thereby to vary the phase relationship between the electromotive forces applied to the grids 24 and 25 with respect to the electromotive forces applied to the plates 22 and 23 in such a direction as to cause current to flow in the output circuit and through the armature 13 of the motor 10. When the manually controlled knob 60 has been rotated in a counterclockwise direction sufficiently to rotate the rotor member 54 of the phase shifting device through an angle of approximately 50 electrical degrees, the armature current will be progressively increased to normal full value and the motor 10 will be operating at a speed represented by the point "a" on the curve 64 of Fig. 2; the curve 64 being plotted between rotations per minute of the motor as ordinates, and degrees of rotation of the master control knob as abscissae. When the speed of the motor has reached the value represented by the point "a" the segmental gear 62 will have become disengaged from the gear wheel 58 and the segmental gear 63 will engage the gear wheel 59. As the rotation of the knob 60 is continued the rotor of the phase shifting device 55 will be rotated in such a direction that it will vary the phase relationship between the potentials applied to the anodes 28 and 29 and the grids 30 and 31 to decrease the current flowing in the field winding 14 as a result of which the speed of the motor will be further increased to a value represented upon the speed curve 64 by the point "b". During the time that the gear segment 63 is in engagement with the gear wheel 59 the gear segment 62 and the gear wheel 58 are out of engagement and consequently the rotor member 54 of the phase shifting device 55 remains stationary and the armature current remains approximately constant for this period.

When the speed of the motor has reached the value represented by the point "b" on the speed curve 64 the gear segment 63 will have become disengaged from the gear wheel 59 and the gear segment 62 will reengage the gear 58 and further rotation of the manually operable knob 60 in the counterclockwise direction will effect further increase in the armature current supplied to the motor 13 until when the rotor member 54 of the phase shifting device 45 has been rotated through approximately 55 additional electrical degrees the current supplied to the armature will be approximately double normal value and the speed of the motor will reach a value represented by the point "c" on the speed curve 64.

A dial 65 may be calibrated in revolutions per minute of the motor and a cooperating index member 66 mounted upon the shaft 61 cooperates therewith to indicate the speed at which the motor will rotate for any angular position of the master control knob 60.

It will thus be seen from the above described operation that with full field strength the armature current is varied from zero until approximately normal full voltage is applied to the armature and a substantial speed of the motor has been reached. By maintaining full field strength for the lower speeds we are able to provide satisfactory torque characteristics so that the motor 13 will thereby be enabled to drive the master dimming switch 11 at very low speeds. After the motor has reached a moderate speed such as that represented by the point "a" the field current is weakened further to increase the speed of the motor and the torque characteristics are not seriously disturbed, due to the fact that the armature current has reached a fairly substantial value and is maintained approximately constant during the period that the field current is weakened. The final step of increasing the voltage and current supplied to the armature from normal value to approximately twice normal value serves to extend the speed range of the motor as explained above to the value represented by the point "c" on the speed curve 64. Thus by means of our invention it is possible to vary the armature and field currents of the motor alternately and in a predetermined sequence and thereby operate the motor at any speed within a range having a ratio of as great as 60-1 between top and bottom values and this operation results from the single operation of turning the master controller until the index number 60 registers with the graduation on the dial 65 representing the desired speed.

Although in accordance with the provisions of the patent statutes we have described this invention as embodied in concrete form, we would have it understood that the apparatus and connections shown in the drawings are merely illustrative and are not to be taken in a limiting sense since alterations and modifications will readily occur to persons skilled in the art without departing from the true spirit of the invention or the scope of the annexed claims.

What we claim as new and desire to secure by Letters Patent of the United States, is:

1. In a system for controlling the speed of an electric motor provided with an armature circuit and with a field circuit, means including a control device provided with inductively associated relatively movable winding elements and an electric discharge device controlled thereby for varying the current in the armature circuit, means including a second control device provided with inductively associated relatively movable winding elements and a second electric discharge device controlled thereby for varying the current in the field circuit and means including a master control element operatively connected with said control devices for causing said current varying means to vary the currents in said armature and field circuits alternately and in a predetermined sequence.

2. In a system for controlling the operation of an electric motor provided with an armature circuit and with a field circuit, a separate electric discharge device connected in each of said circuits, means including a separate control device provided with relatively movable inductively associated winding elements for causing said electric discharge devices to vary the currents in said circuits to vary the speed of the motor, a manually operable control device, and means operable in response to operation of said manually operable device for alternately effecting relative movement between the winding elements of each of said control devices for alternately rendering said electric discharge devices operable.

3. In a control system, a pair of vapor electric discharge devices each provided with an input circuit and with an output circuit, an electric motor having its armature connected in the output circuit of one of said devices and its field winding connected in the output circuit of the other of said devices, means for applying alternating electromotive forces to said input and output circuits, means including a separate control device provided with relatively rotatable inductively associated winding elements for varying the phase relationship between the potentials applied to the input and output circuits of each of said devices to vary the current in its output circuit, a manually operable control element and means controlled thereby for alternately effecting relative movement between the winding elements of each of said devices for alternately rendering said discharge devices operable.

4. In a control system, a pair of electric discharge devices each provided with an input circuit and with an output circuit, an electric motor having an armature connected in the output circuit of one of said devices and a field winding connected in the output circuit of the other of said devices, means for applying alternating electromotive forces to said input and output circuits, means including a pair of control devices each provided with a pair of relatively movable winding elements for varying the phase relationship between the potentials applied to the input and output circuits of each of said discharge devices, and means including a master control element and mechanical driving connections between said master element and said control devices for successively effecting relative movement between the winding elements of said control devices to successively vary the current in said armature and field circuits.

5. In a system for controlling the operation of an electric motor provided with an armature circuit and with a field circuit, means including a pair of control devices each provided with a pair of inductively associated relatively rotatable winding elements and a separate electric discharge device controlled by each of said control devices for varying the current in each of said circuits and means including a master control element and driving connections comprising segmental gears and gears driven thereby between said master element and said control devices for intermittently causing said current varying means to vary the armature current while maintaining the field current constant and to vary the field current while maintaining the armature current constant in the interval between variations of the armature current.

6. In a motor control system, a pair of electric discharge devices each provided with an input and an output circuit, a motor having its armature connected in the output circuit of one of said devices and its field winding connected in the output circuit of the other of said devices, a source for supplying alternating voltages to said input and output circuits, a pair of reactance devices one associated with each of said electric discharge devices for varying the phase relationship between the voltages supplied to the input and output circuits of each of said discharge devices to vary the current in said output circuit, a movable control element, and means responsive to continuous movement of said element for selectively rendering said phase varying devices effective in predetermined sequence.

7. In a motor control system, a pair of electric discharge devices each provided with an input and an output circuit, an electric motor having its armature connected in the output circuit of one of said devices and its field connected in the output circuit of the other of said devices, a source of supply for supplying alternating voltages to the input and output circuits of each of said devices, a variable inductance control device having a stationary and an inductively related rotatable winding element associated with each of said discharge devices for varying the phase relationship between the voltages supplied to the input and output circuits of its associated electric discharge device, a gear connected to each of said rotatable winding elements, and a manually operated controlling element and segmental gears operated thereby and meshing with said first mentioned gears for selectively and successively rotating the rotatable elements of said phase varying devices to selectively and successively vary the field and armature currents of said motor.

In witness whereof, we have hereto set our hands this 19th day of May, 1930.
FRANK R. ELDER.
ALLEN E. BAILEY, Jr.
HAROLD B. LA ROQUE.